(12) United States Patent
Nunokawa et al.

(10) Patent No.: US 10,318,075 B2
(45) Date of Patent: Jun. 11, 2019

(54) CASING AND LIGHT EMISSION DEVICE FOR GAME DEVICE

(71) Applicant: SEGA SAMMY CREATION INC., Yokohama-shi, Kanagawa (JP)

(72) Inventors: Hiroki Nunokawa, Tokyo (JP); Kenji Kuwahara, Tokyo (JP)

(73) Assignee: SEGA SAMMY CREATION INC., Yokohama-shi, Kanagawa (JP)

( * ) Notice: Subject to any disclaimer, the term of this patent is extended or adjusted under 35 U.S.C. 154(b) by 127 days.

(21) Appl. No.: 15/534,671

(22) PCT Filed: Dec. 10, 2014

(86) PCT No.: PCT/JP2014/082669
§ 371 (c)(1),
(2) Date: Jun. 9, 2017

(87) PCT Pub. No.: WO2016/092648
PCT Pub. Date: Jun. 16, 2016

(65) Prior Publication Data
US 2017/0344188 A1 Nov. 30, 2017

(51) Int. Cl.
*G06F 3/042* (2006.01)
*A63F 13/90* (2014.01)
*F21V 8/00* (2006.01)

(52) U.S. Cl.
CPC ............ *G06F 3/0421* (2013.01); *A63F 13/90* (2014.09); *G02B 6/0028* (2013.01)

(58) Field of Classification Search
None
See application file for complete search history.

(56) References Cited

U.S. PATENT DOCUMENTS

| | | | | |
|---|---|---|---|---|
| 2005/0276566 | A1* | 12/2005 | Iimura | G02B 6/0018 385/146 |
| 2008/0106396 | A1* | 5/2008 | Hsieh | B60Q 1/2665 340/475 |
| 2012/0026095 | A1* | 2/2012 | Tanaka | G06F 1/1615 345/168 |

(Continued)

FOREIGN PATENT DOCUMENTS

| | | |
|---|---|---|
| JP | 2006-223606 A | 8/2006 |
| JP | 2006223606 A * | 8/2006 |

(Continued)

*Primary Examiner* — Patrick N Edouard
*Assistant Examiner* — Peijie Shen
(74) *Attorney, Agent, or Firm* — Drinker Biddle & Reath LLP

(57) ABSTRACT

A light emission device is used for a casing of the game device. This light emission device comprises a light source disposed in the casing, and a light guiding member having a plate-like shape, the light guiding member being configured to guide light emitted from the light source and being attached to the casing. The light guiding member comprises a reflecting unit configured to reflect the light incident from a first direction along a thickness direction of the light guiding member to a direction different from the first direction to diffuse the light in the interior of the light guiding member; and a light emission part configured to transmit the light reflected from the reflecting unit to outside from a surface of the light guiding member.

13 Claims, 17 Drawing Sheets

(56) References Cited

U.S. PATENT DOCUMENTS

| | | | | |
|---|---|---|---|---|
| 2012/0270648 A1* | 10/2012 | Rasmussen | ......... | G07F 17/3211 |
| | | | | 463/30 |
| 2015/0193017 A1* | 7/2015 | Igarashi | .................. | G06F 3/041 |
| | | | | 345/161 |
| 2015/0316708 A1* | 11/2015 | Birman | ................ | G02B 6/0051 |
| | | | | 362/607 |

FOREIGN PATENT DOCUMENTS

| JP | 2008-295771 A | | 12/2008 |
|---|---|---|---|
| JP | 2008295771 A | * | 12/2008 |
| JP | 4760047 B2 | | 8/2011 |
| JP | 2011-200497 A | | 10/2011 |
| JP | 2013-178971 A | | 9/2013 |
| JP | 2013178971 A | * | 9/2013 |

* cited by examiner

CASING AND LIGHT EMISSION DEVICE FOR GAME DEVICE

CROSS-REFERENCE TO RELATED APPLICATIONS

This application is the U.S. national phase of the International Patent Application No. PCT/JP2014/082669 filed Dec. 10, 2014, the entire content of which is incorporated herein by reference.

TECHNICAL FIELD

The present disclosure relates to a light emission device to be attached to a casing of a game device, and relates to the casing.

BACKGROUND

Conventionally game devices have been used, which include various types of illumination, such as lamps and light emissions. One example of such game devices is configured to diffuse light emitted from a light source radially at a part of the device, and then to reflect the light from the entire face uniformly to a certain direction (see JP 2011-200497A1, for example).

Recently popular game devices are of a type comprising a several satellites (station devices) around a large casing to allow players of the individual satellites to play a common game so that they can participate with their satellites. For illumination of such a game device, a proposed device comprises lamps at a blindfold board between the satellites, for example (see JP 4760047B, for example).

SUMMARY

Since illumination such as lamps and light emissions in game devices are to brighten the game with visual effects having a certain character and give a colorful mood to the game, such illumination is always required to be new similarly to the design, decoration and the like of the device. From this point, although various types of illumination such as lamps and light emissions for game devices have been proposed, there is room for further improvements and innovations.

Then, an object of the present disclosure is to provide a light emission device for game device and a casing having an unconventional configuration and brightening the game device with a certain feature.

To solve the above problem, the present inventor has arrived at the present disclosure as a result of considerations for the brightening effect of games with unprecedented configuration and a certain feature. A light emission device to be attached to a casing of a game device of the present disclosure comprises: a light source that is disposed in the casing; and a light guiding member having a plate-like shape, the light guiding member being configured to guide light emitted from the light source and being attached to the casing. The light guiding member comprises: a reflecting unit configured to reflect the light incident from a first direction along a thickness direction of the light guiding member to a direction different from the first direction to diffuse the light in the interior of the light guiding member; and a light emission part configured to transmit the light reflected from the reflecting unit to outside from a surface of the light guiding member.

In this light emission device, light from the light source is incident on the face of the plate-like light guiding member from a first direction along the thickness direction (typically the direction in which the thickness is the smallest) of the light guiding member. The incident light is reflected from the reflecting unit in a direction different from the first direction and is diffused in the interior of the plate-like light guiding member to be directed to the end (the outer periphery or the inner periphery of the light guiding member). Then, the light is refracted or irregularly reflected at the light emission part and transmits to the outside through the surface of the light guiding member. Due to such transmitting light, the light emission part of the light guiding member appears to shine for the viewer (comprising the player).

In this way, since this light emission device comprises a light source disposed inside of the casing, the light emission device can be configured so that the viewer does not see the light from the light source directly. This can prevent the viewer from seeing the light source directly so that the position of the device only appears to be bright. Instead the device appears to have uniform brightness. Since the incident light is reflected from the reflecting unit for diffusion, light can be emitted smoothly without excessive contrast at the light emission part.

The light emission part may be formed along an end of the light guiding member.

The light emission part may include regularly arranged or irregularly arranged unevenness that is formed by surface treatment.

The light emission device for game device further may include a covering member configured to block light transmitting from a face opposed to an incidence face out of the light incident from the first direction.

The light guiding member may be disposed at a rear part of the casing.

The light emission device may further include a transmission member configured to transmit light from the light source to be incident on the light guiding member.

The light guiding member may have an upper end that is disposed higher than the casing.

The light guiding member may be curved at a part or as a whole from the upper end to a lower end.

The light guiding member may be a frame member disposed corresponding to an input screen for a game being played at the casing or a display screen of game information.

The covering member may be a panel that is stacked on the light guiding member.

The light source may include a plurality of LEDs enabling emission of light in a plurality of colors.

A casing for game device according to the present disclosure comprises any one of the light emission device as stated above.

The casing for game device may be used for a casing of a station device, the station device making up a game device, the game device comprising a main device and a plurality of the station devices disposed relative to the main device, the station device allowing a player of a game to perform operations and inputting.

In the casing for game device, color of light emitted from the light emission device may be changed or the light may blink when the station device comprising the casing has trouble, such as malfunction.

Advantageous Effects of Disclosure

The present disclosure can have an unconventional configuration and can brighten the game device with a certain feature.

BRIEF DESCRIPTION OF THE DRAWINGS

Various embodiments of the disclosure are illustrated in the drawings, in which.

DETAILED DESCRIPTION

Figure 1:
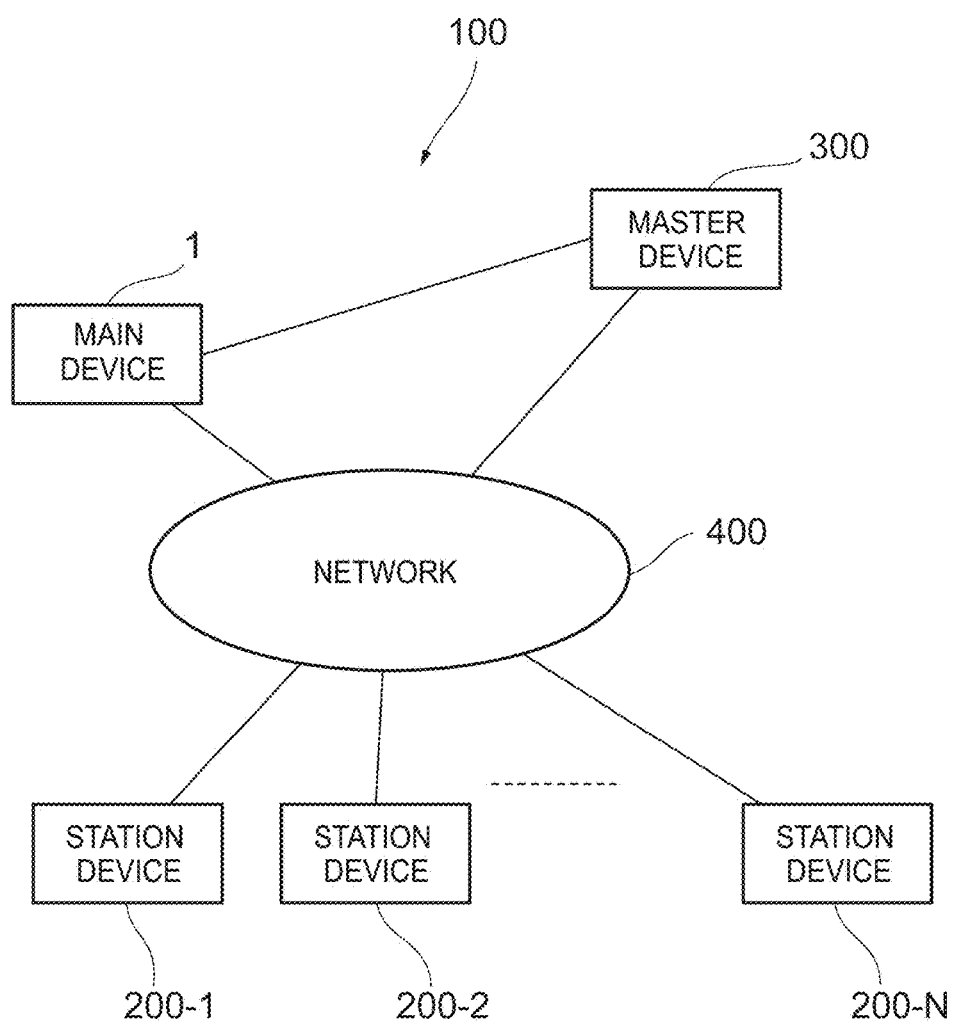
FIG. 1 schematically shows the configuration of a game device in one embodiment of the present disclosure.

The following specifically describes the configuration of the present disclosure by way of an exemplary embodiment shown in the drawings.

FIG. 1 schematically shows the configuration of a game device 100 in the present embodiment. The game device 100 comprises a main device 1, a plurality of station devices 200-N (N denotes a natural number of 2 or more) disposed around the main device 1, a master device 300 to control the main device 1 and the station devices 200-N, a control unit 80 and a storage unit 90. The main device 1 may be of various types depending on the types of the game, and is not limited especially in types. For example, this is a roulette lottery device for a roulette game or a dice lottery device for a dice game to allow a player to roll a dice for physical lottery based on the number on the rolled dice.

This game device 100 comprises a relatively large main device 1 that is easy to see from every station device 200-N, and the plurality of station devices 200-N is disposed in front of the main device 1 to allow a plurality of players to enjoy the same game at the same time. In this way, this game device can provide a new entertaining game. Hereinafter the side of the game device viewed from the main device 1 on which the players are located (on the side where the station devices 200-N are disposed) is called a front face, and the opposite side is called a rear face or a rear-part side. In this way, the front-back direction of the device is shown. On a horizontal plane of the game device, the direction orthogonal to the front-back direction (direction connecting the front face and the rear face) is the left-right direction.

The main device 1 and the master device 300 or the master device 300 and each station device 200-N (hereinafter unless each station device has to be identified, it is called a station device 200 simply) are connected by wire and/or wirelessly via a network 400, such as LAN (Local Area Network), WAN (Wide Area Network), or the Internet (see FIG. 1). The players who participate in the game can enjoy the game by bet, for example, using their individual station devices 200.

Figure 3:
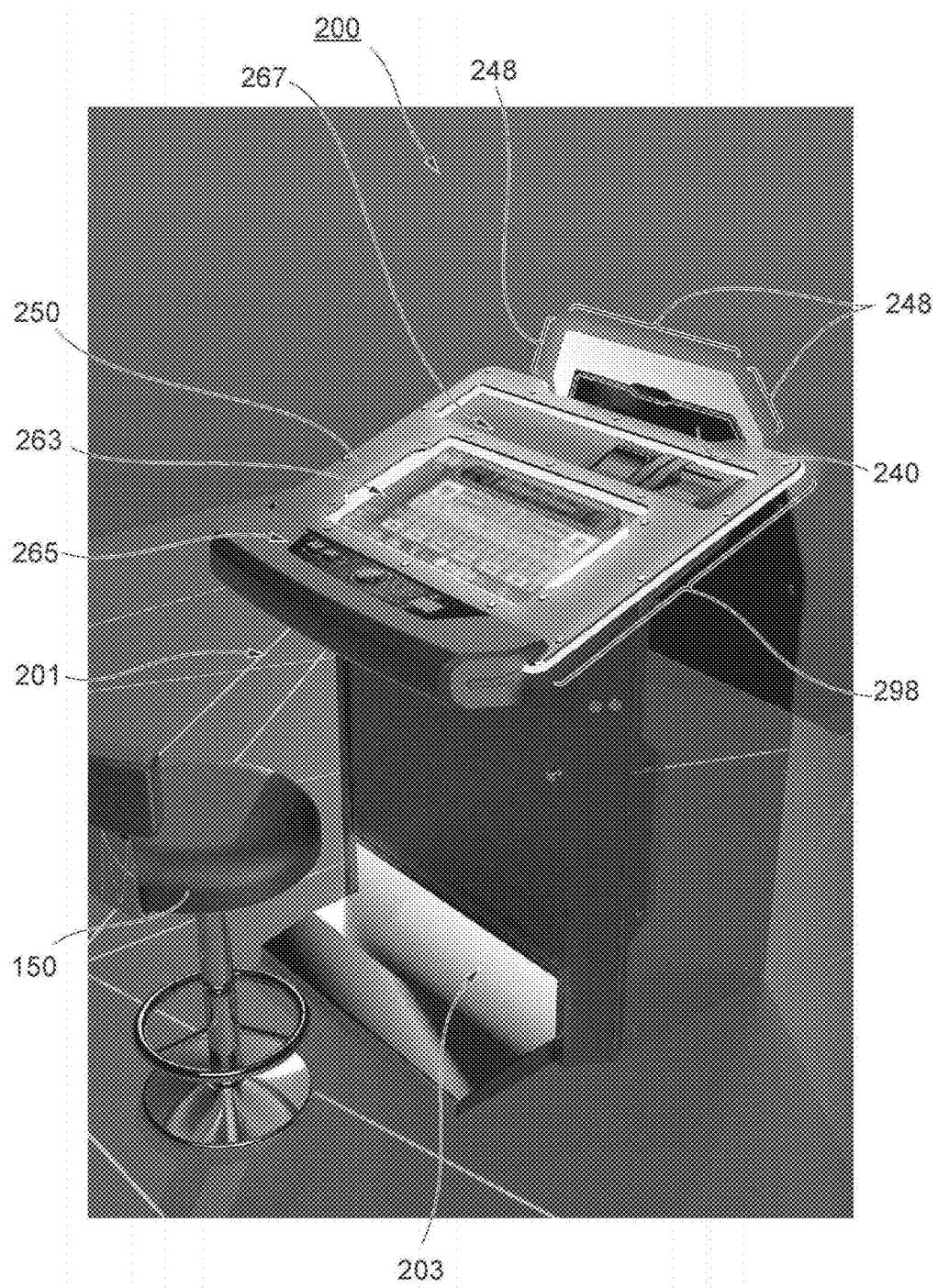
FIG. 3 is a perspective view showing one example of a station device comprising a casing having a light emission device according to the present disclosure.

Each station device (this may be called a satellite) 200 has a casing 201 for operations, by which each player can perform operations and inputting, for example (see FIG. 3, for example). The game device 100 of the present embodiment comprises the plurality of casings 201 disposed in front of the main device 1 to keep good viewability of motions (motions of roulettes or balls, for example) and displays (history displayed, for example) on the main device 1 from all of the casings 201. At a lower part of each casing 201, a footlight 203 is disposed to illuminate the lower part of the feet of the player sitting on a chair 150 (see FIG. 3). The casing 201 comprises a game table display unit 263 (see FIG. 3, for example) having a touch panel screen on the upper face. The casing also comprises an operation unit 265, a bill insertion/card reader unit 267 and the like if needed (see FIG. 3, for example).

The game table display unit 263 comprises a touch-panel type liquid crystal display that is a display means to output a game field as an image. For instance, as the game goes on, a command key is displayed on the liquid crystal display as needed. Then the player can touch the touch panel at a part on the command key directly with the hand, whereby various types of command signal can be input to a game control circuit.

The operation unit 265 comprises input devices, such as buttons, dials and levers, disposed in front of the game table display unit 263. Through the operation of these input devices at the operation unit 265, a predetermined command signal is input to the game control circuit.

The bill insertion/card reader unit 267 is disposed at a part farther from the player (closer to the rear-part) than the game table display unit 263 is. This comprises a slot for insertion of bills, a card reader and the like. Although not shown in details, in a specific example, the rectangular panel on the left of the player comprises a card reader and a liquid crystal display device (comprising a player tracking system to display points that a player has when the player has a membership, for example). The rectangular panel at the center comprises an outlet of a printer from which a ticket is ejected. The rectangular panel on the right comprises an inlet of a bill discrimination device.

The control unit 80 comprises a CPU and a memory (ROM or RAM), and is configured to execute a game program 91 in the storage unit 90 to implement various types of functions and control the game device 100 as a whole. The functions that the control unit 80 implements include a game control unit 81, a driving system control unit 82, a display control unit 86, a sound control unit 87, and an illumination control unit 88 (see FIG. 2). The control unit 80 and the storage unit 90 may be disposed at the main device 1 or at the master device 300 as long as their functions can be implemented.

Figure 2:
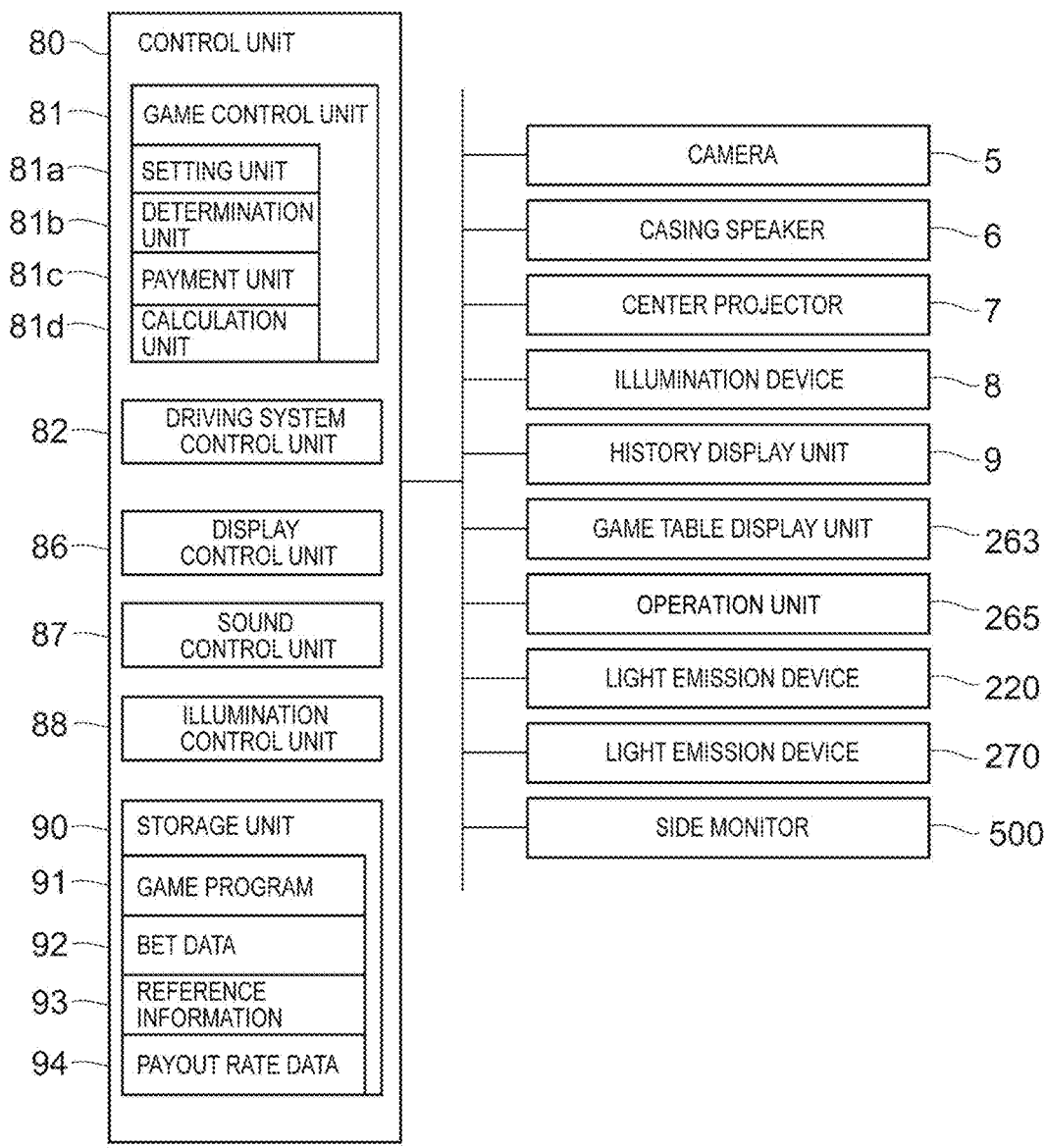
FIG. 2 is a block diagram showing an example of the configuration of the game device.

The control unit 80 controls various types of configurations of the game device 100. For example, the control unit controls a camera 5, a speaker 6 of the casing, a center projector 7, an illumination device 8, a history display unit 9, a side monitor 500 (descriptions on the details of these units are omitted, and they are shown in FIG. 2 only), the game table display unit 263, the operation unit 265 and the like (see FIG. 2). For instance, an operation signal from the operation unit 265 when the player bets at the game table displayed on the game table display unit 263, and a detection signal detected by various sensors are sent to the control unit 80. The storage unit 90 stores a game program 91, bet data 92, reference information 93, payout rate data 94 and the like (see FIG. 2).

The game control unit 81 executes the game program 91 in the storage unit 90 to control the game. The game control unit 81 stores the bet data 92 according to the progress of the game, the reference information 93 indicating the history on the past results of the game, and accumulates the data 94 on the payout rate.

The game control unit 81 also has the functions as a setting unit 81a, a determination unit 81b, a payment unit 81c and a calculation unit 81d to execute the game. The setting unit 81a sets various types of values of the game as the game goes on. The determination unit 81b determines a winning number based on a signal detected by the sensor. When the determination unit 81b determines that the guess is right, the payment unit 81c makes payment for the setting of the guess. The payment unit 81c makes the payment of chips in number corresponding to the bet. The calculation unit 81d executes predetermined calculations in accordance with the determined winning number (e.g., calculations on the payout rate and the probability of each pip of a dice facing upward), and stores the calculated payout rate as the payout rate data 94 (see FIG. 2).

The driving system control unit 82 controls operations of various types of driving devices of the main device 1 (for instance, in the case of a roulette game, the operation of a roulette by a driving motor of the roulette, or the operation of ball release by a ball-releasing device). The display control unit 86 controls the display on the game table display unit 263, the history display unit of the main device 1 and the like under the control of the control unit 80. The sound control unit 87 controls the output of sounds and various sound effects from the speaker 6 of the casing as the game goes on. The illumination control unit 88 controls illumination at the illumination device 8 and the like.

The storage unit 90 comprises a hard disk device and the like, and stores various types of programs and data. The data stored in the storage unit 90 comprises the bet data 92 indicating the status of bet set by the setting unit 81a, the reference information 93 for reference on the bet that is provided to the player during the time when the player can bet (history information on the pips facing upward or the rate of each pip facing upward in the past games) and the payout rate data 94 indicating the current payout rate calculated by the calculation unit 81d.

Figure 4:
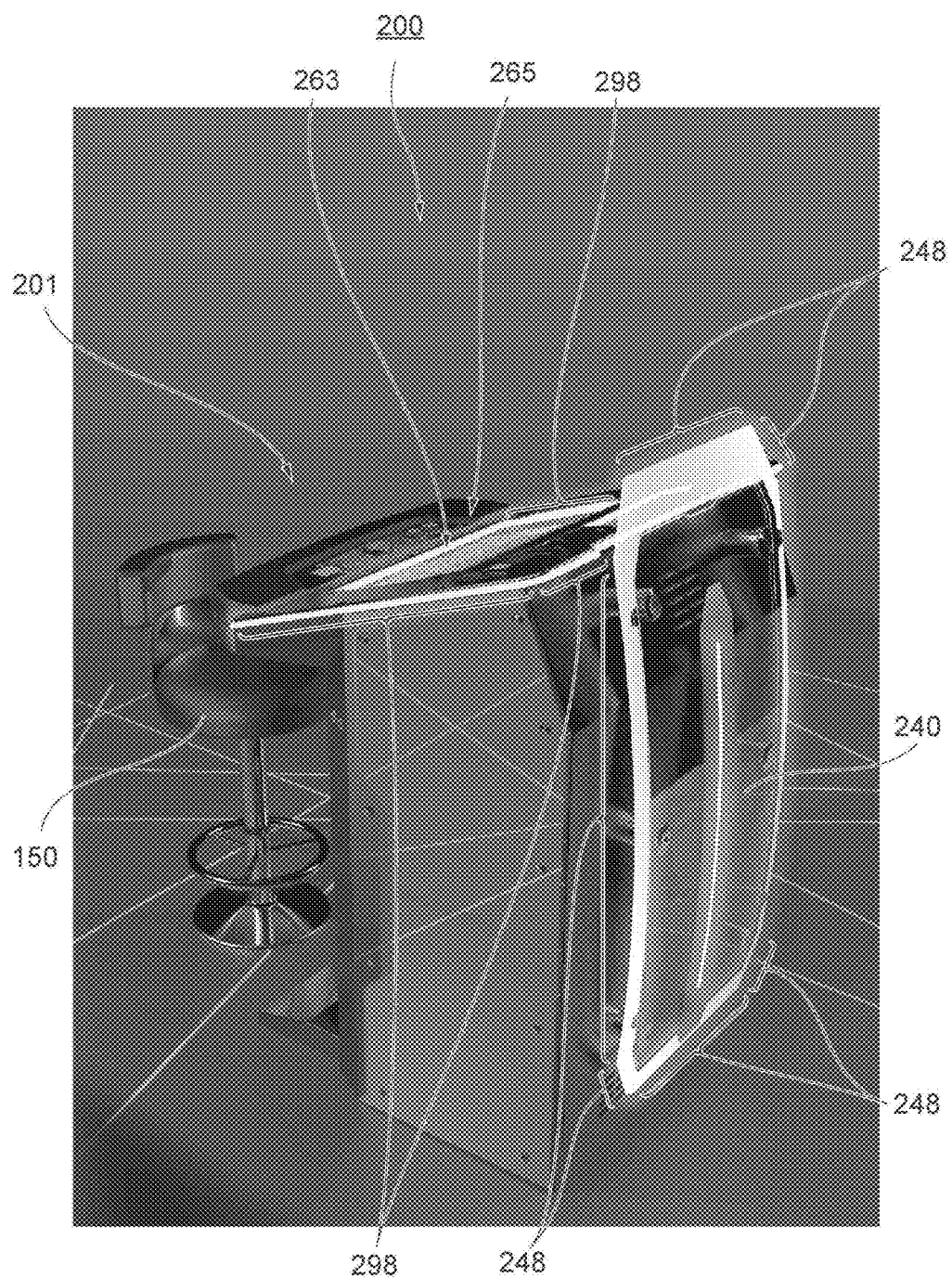
FIG. 4 is a perspective view of the station device viewed from the backward.

Next, the following describes a light emission device of the casing 201 of the station device 200. The station device 200 of the present embodiment comprises light emission devices disposed at the rear part and on the upper face (at the game table display unit 263, for example) (see FIGS. 3 and 4).

Light Emission Device at the Rear Part of the Casing

A light emission device 220 at the rear part of the casing 201 of the station device 200 comprises a light source 222, a light transmission acrylic rod member (transmission member) 224, a supporting member 225, a urethane washer 226, a boss 227, a light source 232, a light transmission acrylic board member 234, supporting angle members 235, 236, a light guiding acrylic board 240, and the like (see FIGS. 3 to 10).

Although the arrangement, the number and the types of the light sources are not limited especially, two types of LEDs are used in the present embodiment for the light sources 222 and 232. These light sources 222 and 232 are disposed inside of the casing 201 (see FIG. 5, for example).

The light source 222 comprises a LED disposed at a channel-like cabinet fixing part 223. This light source is disposed inside of the casing 201 to emit light toward the rear face of the casing 201 (see FIG. 6, for example). The cabinet fixing part 223 making up a LED unit 221 is fixed to the frame on the side of the rear face of the casing 201 with a screw or the like.

The light transmission acrylic rod member 224 is a rod member that is circular in cross section and is made of acrylic resin. The light transmission acrylic rod member is disposed behind the light source 222 to intervene between the light source 222 and the light guiding acrylic board 240. The light transmission acrylic rod member 224 has one end face 224a through which light emitted from the light source 222 enters and the other end face 224b from which the light exits to transmit the light to the light guiding acrylic board 240. The light transmission acrylic rod member 224 may have a stepped shape such that the outside diameter changes at some part in the length direction. In this case, the stepped part functions as a stopper against the cabinet fixing part 223, which leads to easy positioning of the light transmission acrylic rod member 224.

The supporting member 225 is a tubular member made of aluminum, for example, and is a member to support the light guiding acrylic board 240. In the present embodiment, the supporting members 225 are disposed at 6 positions, comprising 3 positions at the upper, the middle, and the lower of the left and right 2 lines viewed from the rear face (see FIGS. 9 and 10, for example). One of such support members 225 has a through hole 225a to let the light transmission acrylic rod member 224 pass through (see FIG. 6, for example). The other through holes 225b function as holes to let screws pass through, and the screws are to fix the supporting members 225 to the casing 201 or to fix the light guiding acrylic board 240 to the supporting members 225 or the casing 201. Between the supporting members 225 and the light guiding acrylic board 240, a urethane washer 226 and a boss 227 are disposed as needed (see FIG. 7).

The light source 232 comprises a plurality of LEDs disposed vertically. These plurality of belt-like LEDs are disposed at a supporting frame 233 made of aluminum, for example, to keep equal distance to one another. These LEDs make up a LED unit 231 together with this supporting frame 233 (see FIG. 7, for example). The LED unit 231 is disposed inside of the casing 201 to emit light toward the rear face of the casing 201 (see FIG. 5, for example).

The light transmission acrylic board member 234 is a vertically long board member made of acrylic resin, and has a shape corresponding to the light source 232. The light transmission acrylic board member is disposed behind the light source 222 to intervene between the light source 232 and the light guiding acrylic board 240 (see FIG. 5, for example). The light transmission acrylic board member 234 has one end face 234*a* through which light emitted from the light source 232 enters and the other end face 234*b* from which the light exits to transmit the light to the light guiding acrylic board 240. The other end face 234*b* of the light transmission acrylic board member 234 has a curved face that gently curves along the curved light guiding acrylic board 240.

The supporting angle members 235, 236 support the light transmission acrylic board member 234. The supporting angle members 235, 236 of the present embodiment include a left and right pair of angle members that are disposed to sandwich the light transmission acrylic board member 234 from both sides (see FIGS. 7 and 8, for example). One of these pair of supporting angle members 235, 236 (e.g., 235) has a protrusion 235*a* that passes through a through hole of the light transmission acrylic board member 234 to fit a through hole 236*a* (or a concave) of the other supporting angle member (e.g., 236). These supporting angle members 235, 236 are attached to the rear face of the casing 201 (see FIG. 5, for example).

The light guiding acrylic board (light guiding member) 240 is a plate-like member that is disposed at the rear part of the casing 201, and is configured to guide light emitted from the light sources 222, 232 so that a predetermined position appears to shine. As is evident from the drawings, this light guiding acrylic board 240 has a rectangular shape that is vertically long, i.e., the dimension in length (vertical direction) is larger than the dimension in width (horizontal direction), and is a thin plate having a thickness in the front-back direction that is much smaller than the dimensions in length and width (in this specification, the thickness direction of the light guiding acrylic board 240 may be simply called a thickness direction).

The light guiding acrylic board 240 of the present embodiment is made of acrylic that is lighter in weight than other materials. The light guiding acrylic board 240 is curved gently as a whole from the upper end 240T to the lower end (see FIG. 10, for example), and defines a decorated body like an art work attracting the viewers. The light guiding acrylic board 240 is not limited to such a curved shape as a whole, and may have other shapes, such as having a partly curved part instead of the entirely curved shape, for example.

This light guiding acrylic board 240 has a conical concave 242, a V-letter shaped groove 244 and a light emission part 248. The conical concave 242 and the V-letter shaped groove 244 are to reflect light incident on the light guiding acrylic board 240 along the thickness direction of the light guiding acrylic board 240 to a direction different from the incident direction to diffuse the light in the interior of the light guiding acrylic board 240.

Figure 11:
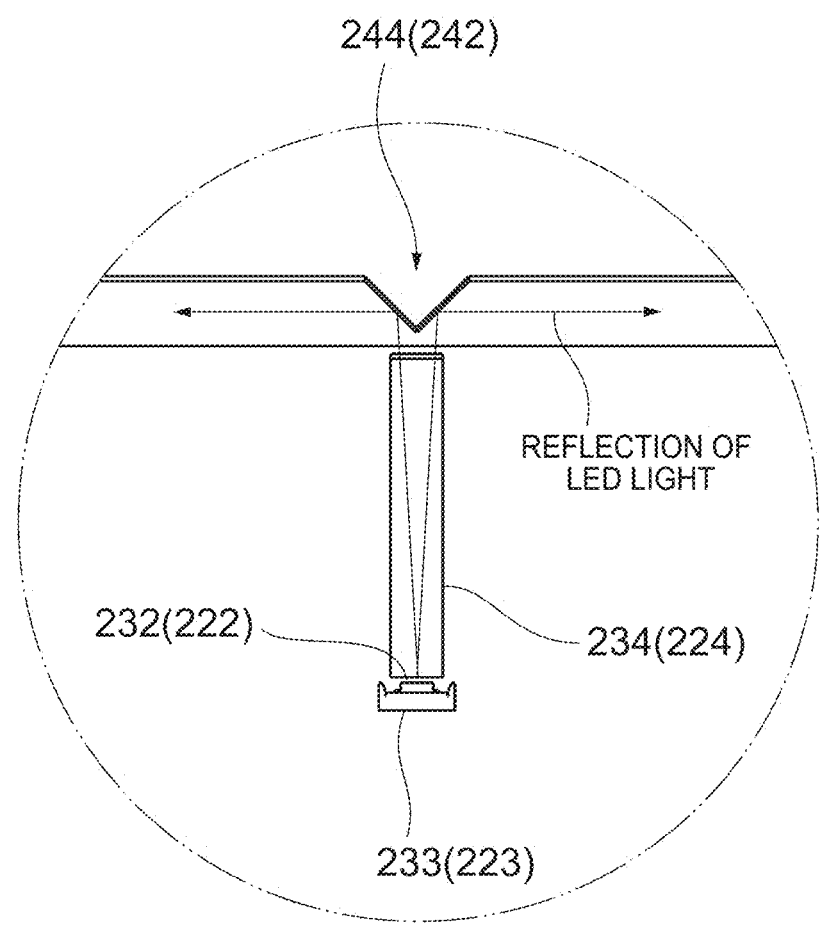
FIG. 11 is an enlarged view of a part indicated with XI in FIG. 8.
Figure 12:
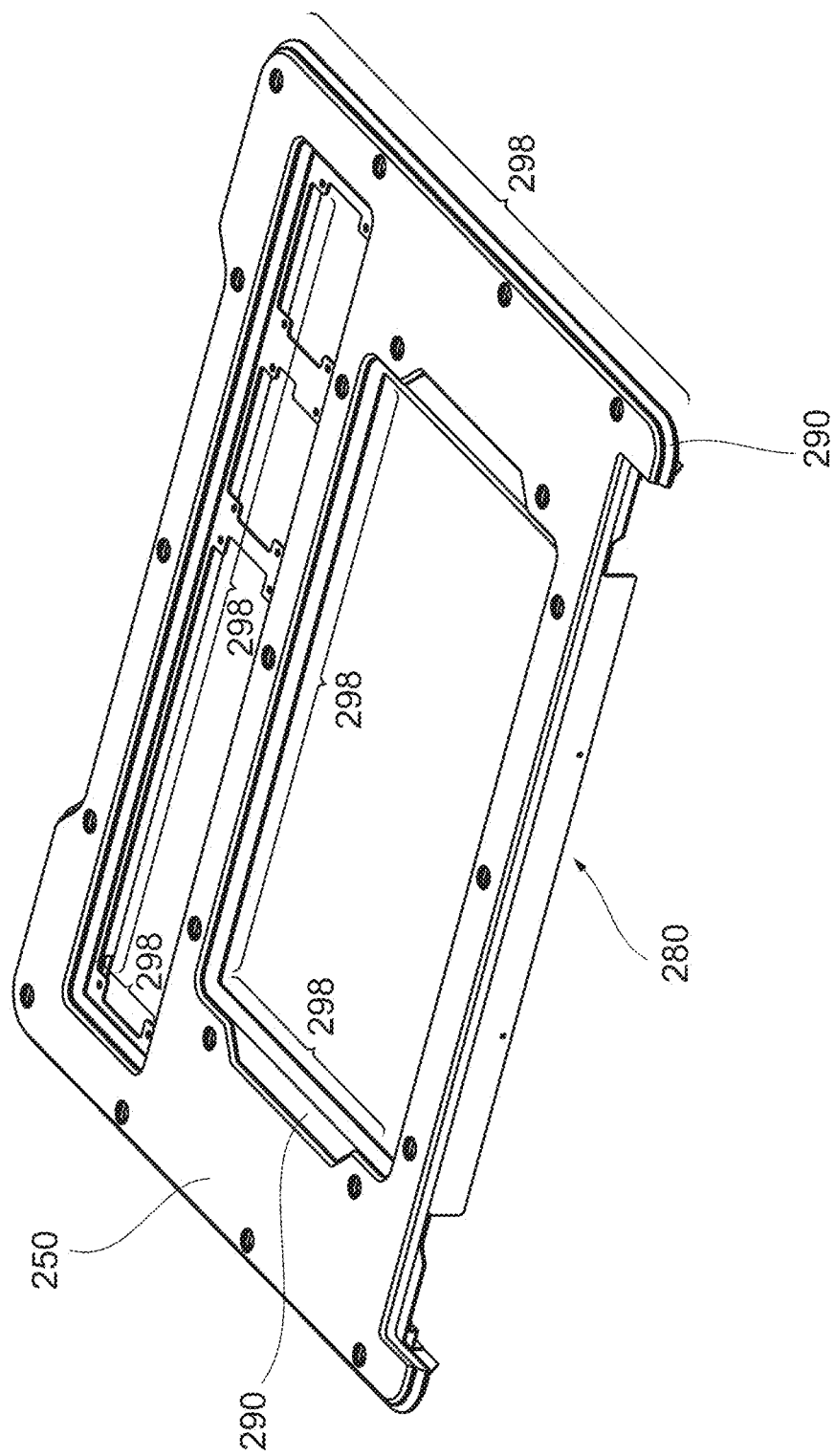
FIG. 12 is a perspective view of a base plate, a light guiding acrylic board, and a panel that are stacked.
Figure 13:
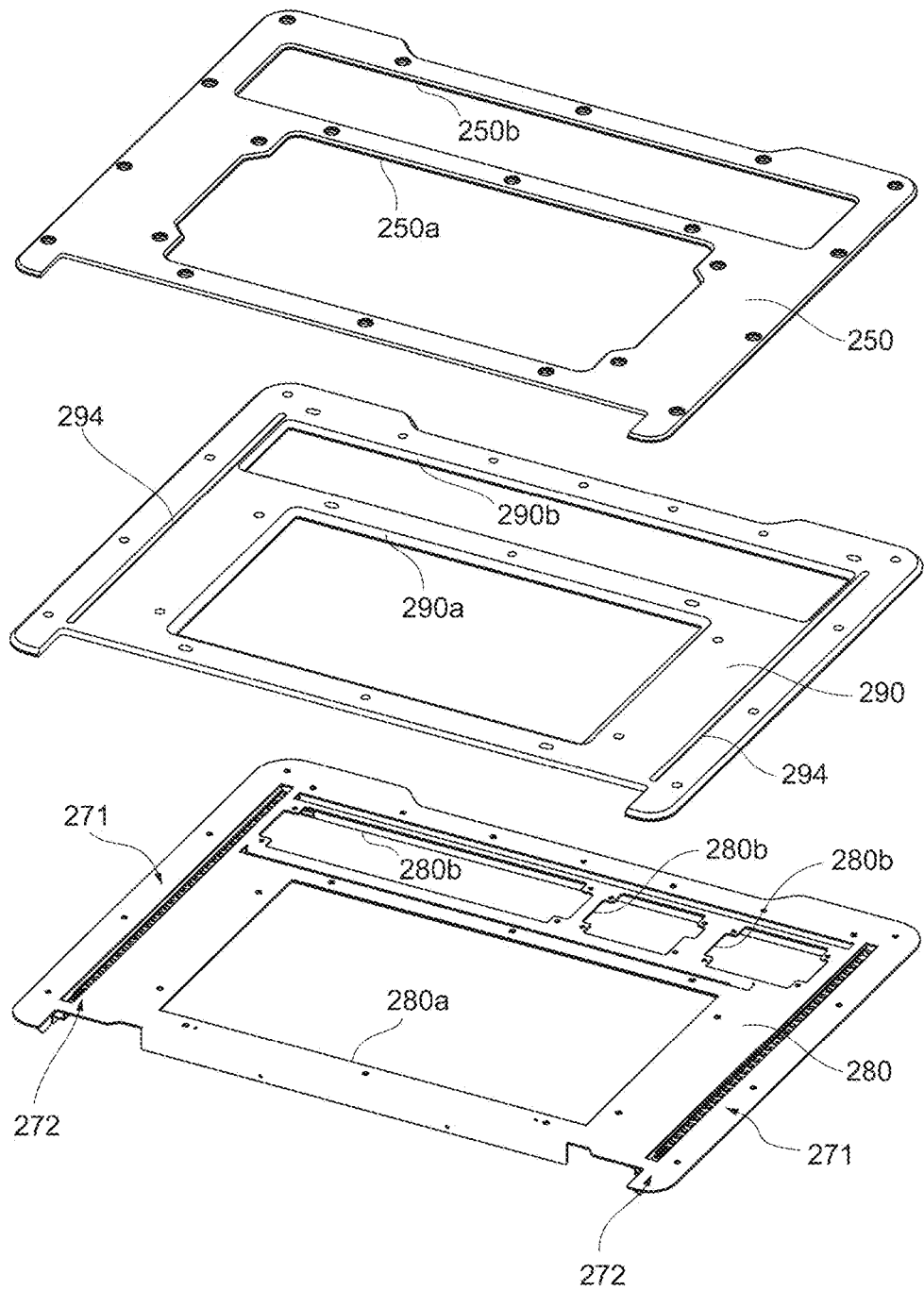
FIG. 13 is an exploded perspective view of the base plate, the light guiding acrylic board, and the panel in FIG. 12.

The conical concave 242 is to reflect the light emitted from the light source 222. In the present embodiment, the conical concave is formed on the side of the rear face of the light guiding acrylic board 240 to be extension of the light transmission acrylic rod member 224 (see FIG. 6, for example). The conical concave 242 of the present embodiment is to reflect the light incident on the light guiding acrylic board 240 through the light transmission acrylic rod member 224 to all directions of 360 degrees for diffusion (see FIGS. 3 and 4). The conical concave 242 desirably has an inclined angle of the conical face relative to the incident axis of the light that is around 45 degrees. This angle, however, is not limited to a specific value as long as it enables diffusion of the reflected light in the interior of the light guiding acrylic board 240 and can prevent the leakage of the reflected light to the outside from a position other than the light emission part 248 of the light guiding acrylic board 240. In the present embodiment, the inclined angle of the reflecting face (conical face) is set at 45 degrees to set the reflected angle at 90 degrees relative to the incident angle of the light. This setting value of the reflecting face will vary with the incident angle. FIG. 11 is an enlarged cross sectional view of the V-letter shaped groove 244 (this is described in details in the following paragraph). In this drawing, since the light guided being incident on the light guiding acrylic board 240 and being reflected from the V-letter shaped groove 244 is the same as at the conical concave 242, reference numeral (242) of the conical concave 242, for example, is added in the parentheses for reference.

The V-letter shaped groove 244 is to reflect the light emitted from the light source 232. In the present embodiment, the V-letter shaped groove is formed on the side of the rear face of the light guiding acrylic board 240 to be extension of the incident direction of the light that is transmitted through the light transmission acrylic board member 234 and is incident on the light guiding acrylic board 240 (see FIGS. 8 and 11, for example). The V-letter shaped groove 244 of the present embodiment comprises a vertically long groove having a V-letter shape in cross section (see FIGS. 7 and 11, for example) corresponding to the shape of the light source 232 comprising the LEDs vertically arranged and the light transmission acrylic board member 234 comprising a vertically long plate member, and is to reflect the light incident on the light guiding acrylic board 240 via the light transmission acrylic board member 234 to the left and right directions for diffusion.

The V-letter shaped groove 244 desirably has an inclined angle of the inclined face relative to the incident axis of the light that is around 45 degrees. This angle, however, is not limited to a specific value as long as it enables diffusion of the reflected light in the interior of the light guiding acrylic board 240 and can prevent the leakage of the reflected light to the outside from a position other than the light emission part 248 of the light guiding acrylic board 240. As long as such a condition is satisfied, the groove has other shapes, such as a U-letter shape in cross section. In the present embodiment, the inclined angle of the reflecting face (the face of the groove) is set at 45 degrees to set the reflected angle at 90 degrees relative to the incident angle of the light. This setting value of the reflecting face will vary with the incident angle.

On the contrary, a part of the light that is transmitted through the light transmission acrylic board member 234 and is incident on the light guiding acrylic board 240 may pass through the V-letter shaped groove 244 as it is. In such a case, a decorated body like an art work having illumination attracting the viewers can be formed, in which a plurality of spots (the number of the spots is the same as the LEDs) arranged vertically appears to shine in the V-letter shaped groove 244.

The light emission part 248 is formed in the light guiding acrylic board 240 to transmit the light reflected from the conical concave 242 or the V-letter shaped groove 244 and is diffused at the light guiding acrylic board 240 to the outside from the surface of the light guiding acrylic board 240. The light arrives at this light emission part 248 and is reflected irregularly for transmission to the outside. Due to the action of this transmitted light, the light emission part 248 appears to shine for the viewers (see FIGS. 3 and 4).

The position of the light emission part 248 in the light guiding acrylic board 240 is not limited especially, and may be disposed at a desired position. In one example, the light emission part 248 of the present embodiment is formed along the end of the light guiding acrylic board 240 having a plate shape, so that the circumference of the light guiding acrylic board 240 appears to shine (see FIGS. 3 and 4).

Figure 5:
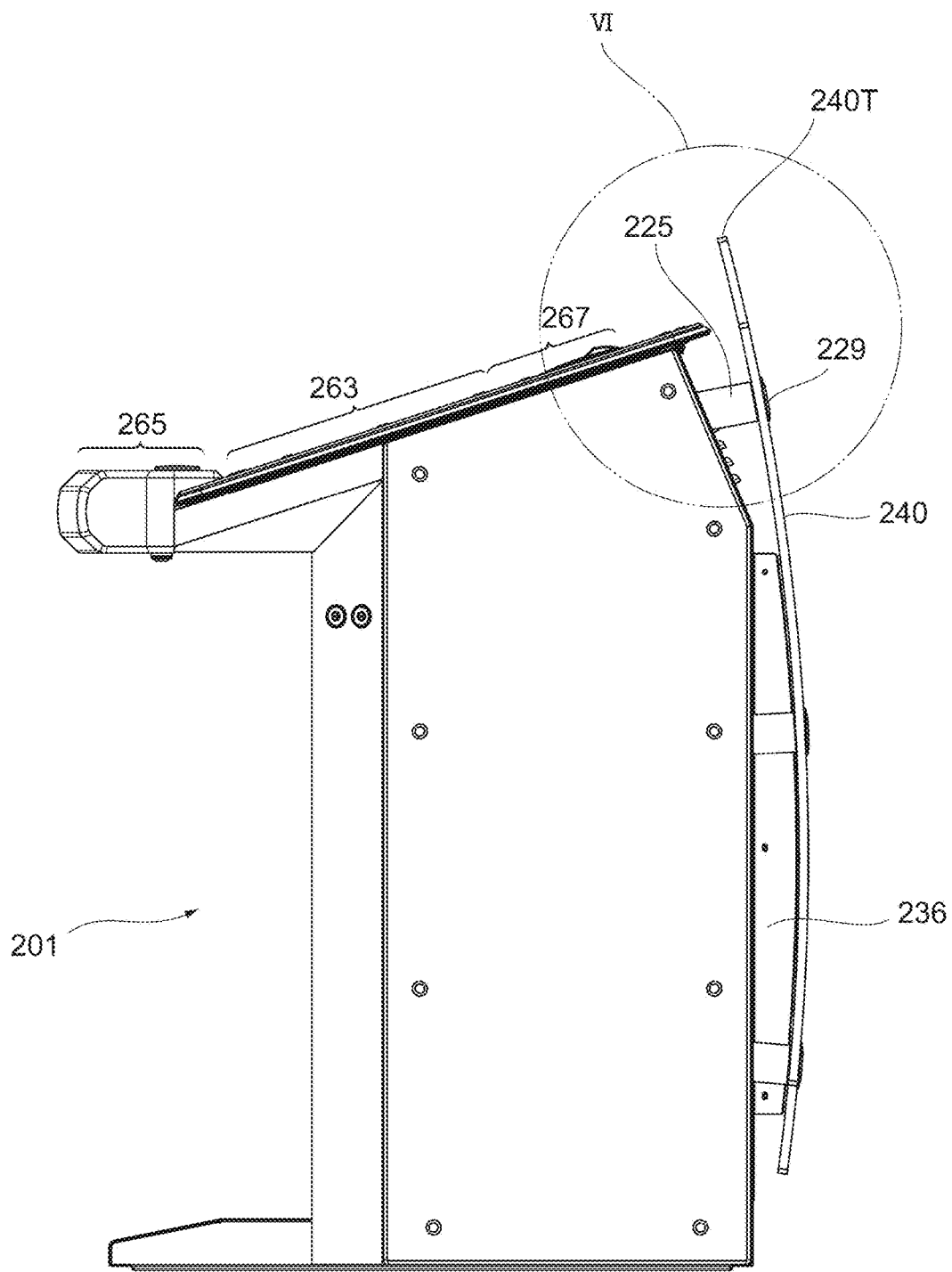
FIG. 5 is a right side view of the station device.
Figure 6:
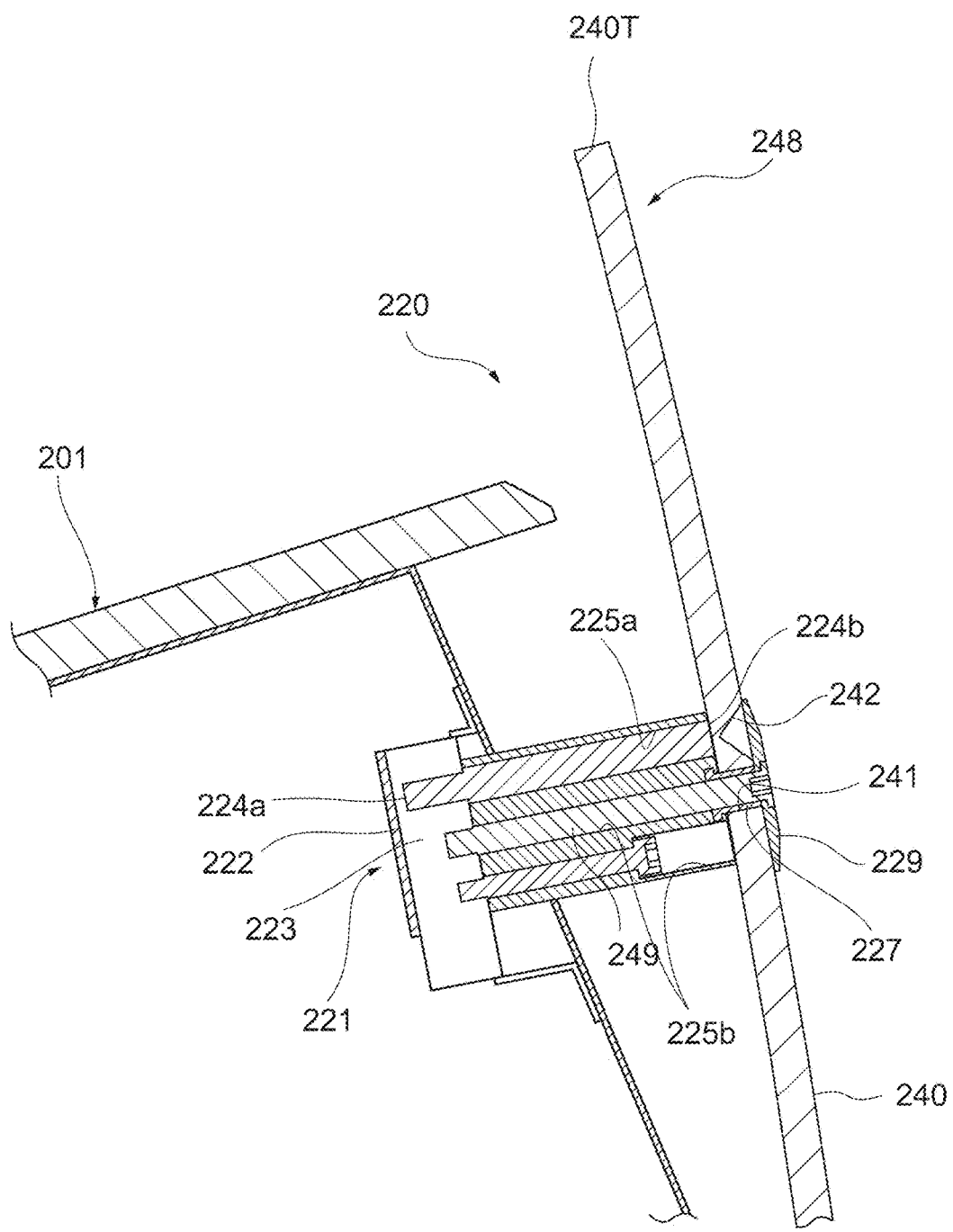
FIG. 6 is an enlarged cross-sectional view of a part indicated with VI in FIG. 5.
Figure 7:
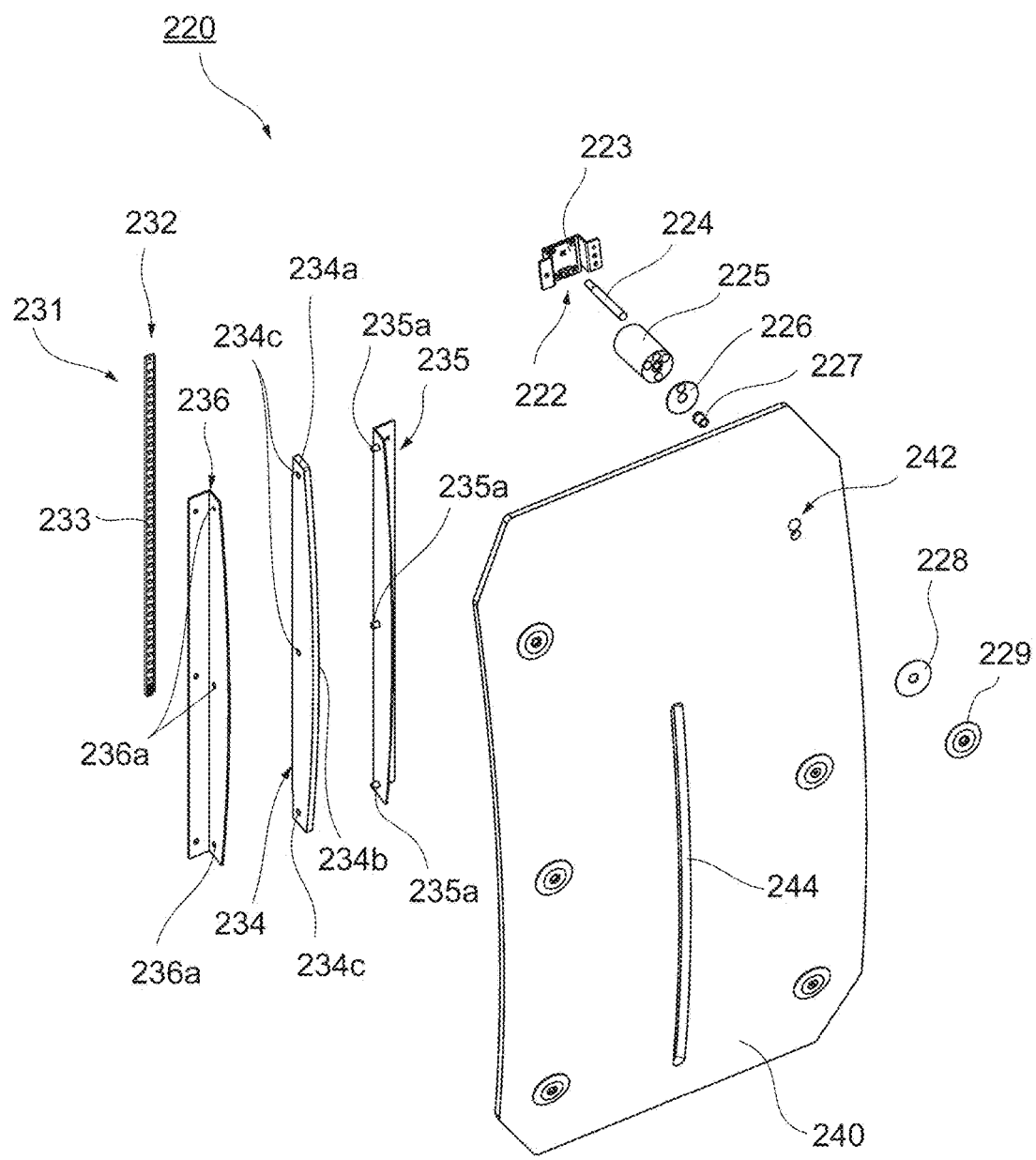
FIG. 7 is an exploded perspective view of the light emission device disposed at a rear part of the casing.
Figure 8:
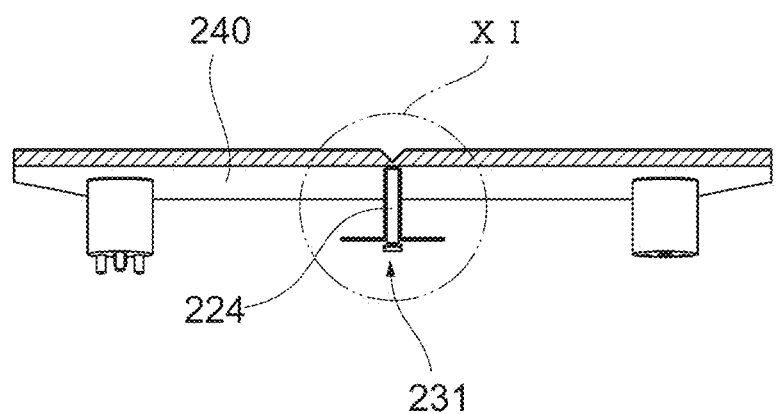
FIG. 8 is a cross-sectional view taken along the line VIII-VIII in the light emission device of FIG. 9.
Figure 9:
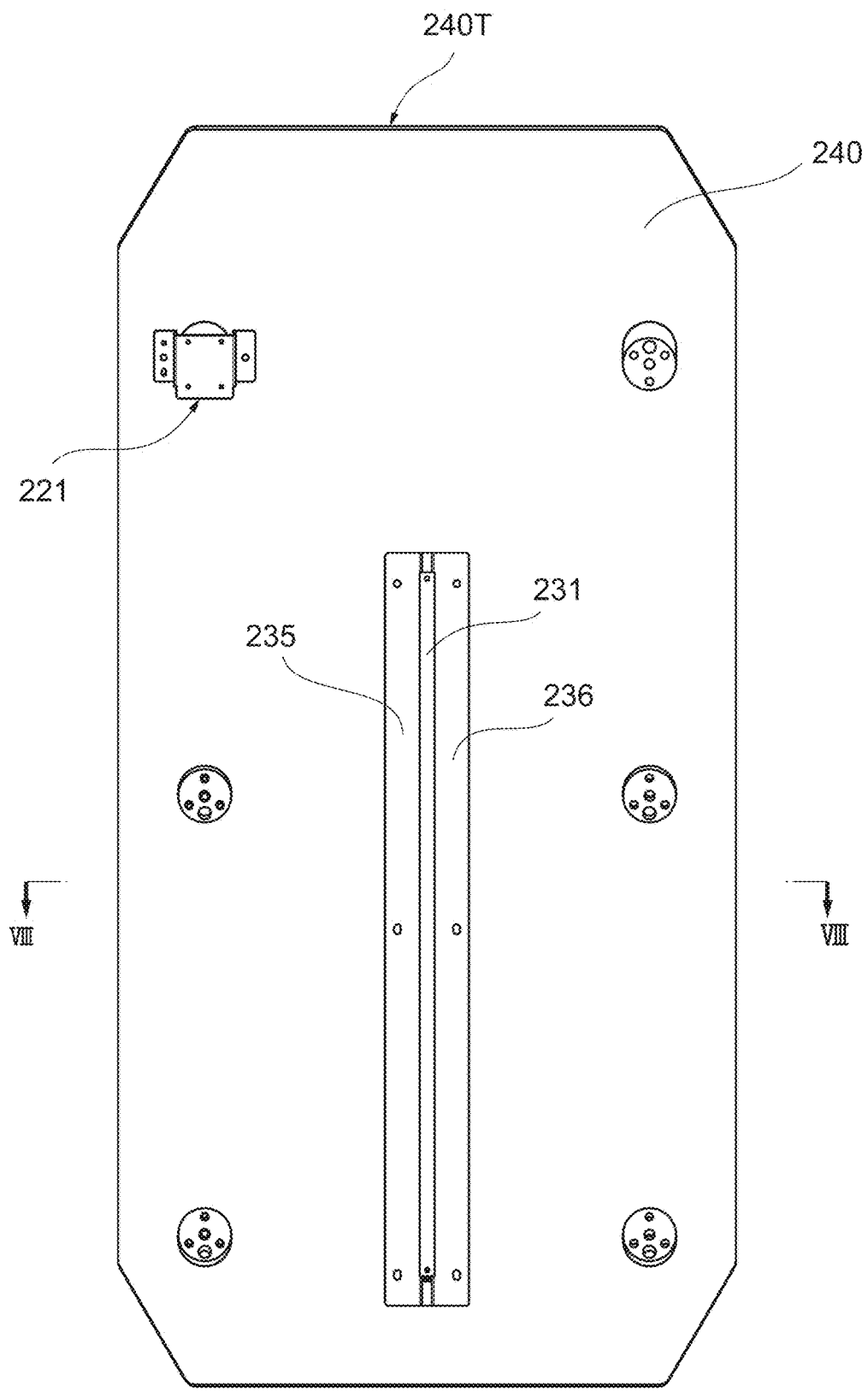
FIG. 9 is a front view of the light emission device disposed at a rear part of the casing.
Figure 10:
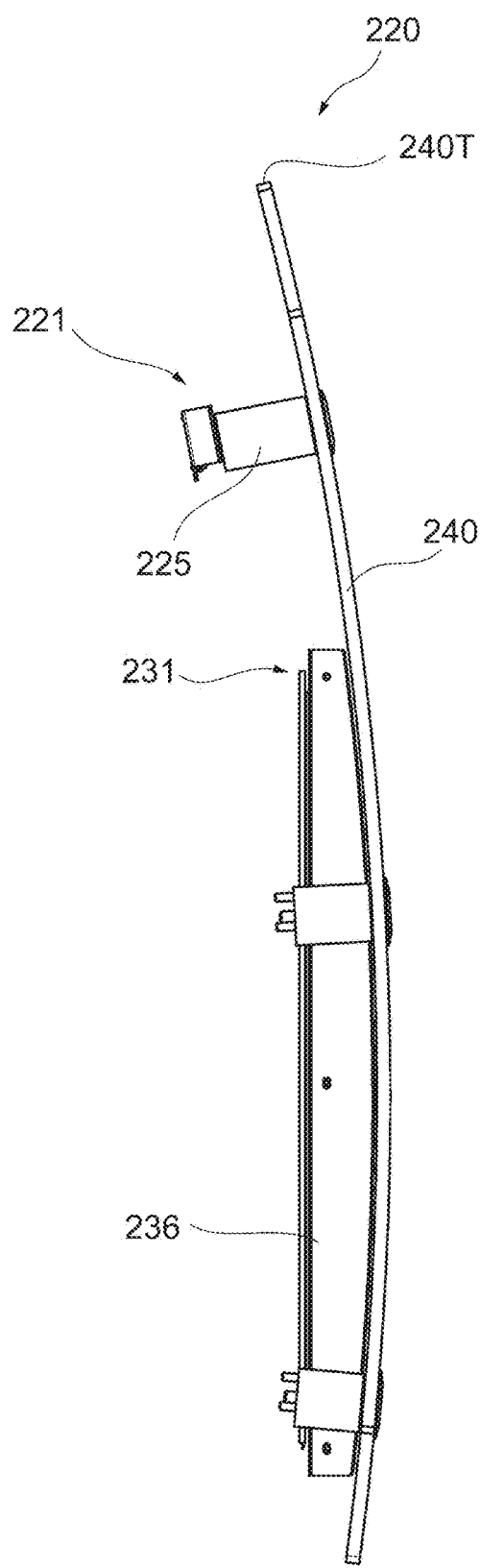
FIG. 10 is a right side view of the light emission device disposed at a rear part of the casing.

In the present embodiment, the light guiding acrylic board 240 is disposed so that the upper end 240T of the light guiding acrylic board 240 is higher than (the upper end of) the casing 201 (see FIG. 5, for example). In such a case, at least a light emission part 248 closer to the upper end 240T of the light guiding acrylic board 240 is higher than the casing 201, and so the light emission part 248 is easy to see from any position around the casing 201 (easy to see because of the shining of the light emission part 248).

The light emission part 248 may include regularly arranged or irregularly arranged unevenness at a predetermined position of the light guiding acrylic board 240 that is formed by surface treatment. Light is irregularly reflected at such an uneven part, and is transmitted to the outside of the light guiding acrylic board 240. Such a light emission part 248 can be formed by forming unevenness by printing, by sandblasting the surface of the light guiding acrylic board 240 or by applying a film with unevenness to the light guiding acrylic board 240, for example. Alternatively, light emission can be implemented by printing in white, for example.

In the present embodiment, surface treatment is performed by printing so that the light emission part 248 appears to shine. Alternatively, the light emission part 248 may be divided into a plurality of regions (e.g., comprising an outer region formed along the end, and an inner region relative to the outer region), and different surface treatment may be performed to these regions. In such a case, the pattern, the transmissivity, the atmosphere of light emission, the transparency or the like can change from one region to another. In this case also, uniform surface treatment may be performed at each of the regions. Then, uniform light emission can be obtained at each region. In a specific example to change the surface treatment from one region to another, processing is performed to the outer region to have regular unevenness and to the inner region to have an appearance like opaque glass (fine scratches are formed on the surface of a sheet glass using a rotating board with abrasive, for example, to prevent the light there from travelling straight by scattering of the light and to give an opaque appearance to the glass).

The light guiding acrylic board 240 of the present embodiment has one light source 222 (other than the light source 232), and the light source is displaced from the center of the light guiding acrylic board 240. With this configuration, the light at a light emission part 248 farther away from the position of the light source 222 becomes darker. However, the light emission parts 248 as a whole can emit light smoothly without excessive contrast.

The light guiding acrylic board 240 may have, at a predetermined position on the rear face, a covering member to block light transmitting through the rear face out of the light incident on the light guiding acrylic board 240. The light emission device 220 of the present embodiment comprises an annular covering member 229 made of stainless steel, for example, on the side of the rear face of the conical concave 242 (see FIG. 7, for example). The covering member 229 blocks light transmitting through the rear face of the light guiding acrylic board 240. The covering member 229 may have a certain design. The covering member 229 is fastened to one end of a connecting pine 249, and the other end of the connecting pin is fastened to the cabinet fixing part 223 (see FIG. 6). The one end of the connecting pin 249 is fastened to the covering member 229 in a through hole 241 that is formed below the conical concave 242, for example.

The urethane washer 228 reduces the tightening with a screw to attach the light guiding acrylic board 240.

Light Emission Device on the Upper Face of the Casing

The upper face of the casing 201 comprises the game table display unit 263 as stated above as well as the operation unit 265 to allow the player to perform various inputting by touching, for example (see FIG. 3, for example). The light emission device 270 on the upper face of the casing 201 comprises a panel 250, a light source 272, a base plate 280, a light guiding acrylic board 290, a V-letter shaped groove 294, a light emission part 298 and the like (see FIGS. 12 to 17, for example).

The casing 201 comprises the light guiding acrylic board 290 as well as the base plate 280 and the panel 250. The base plate 280, the light guiding acrylic board 290 and the panel 250 made of aluminum are stacked from the lower side in this stated order, and they are disposed on the upper face of the casing 201 (see FIGS. 12 and 13, for example).

The base plate 280 is disposed below the light guiding acrylic board 290 to support the light guiding acrylic board 290. The base plate 280 has an opening for display unit 280a and an opening for reader unit 280b (see FIG. 13, for example). The opening for display unit 280a is formed corresponding to the position and the range of the game table display unit 263 of the casing 201. The opening for reader unit 280b is formed corresponding to the position and the range of the bill insertion/card reader unit 267. The opening for reader unit 280b may be divided into a plurality of parts (see FIG. 13). The base plate 280 has a space to dispose a LED unit 271.

The LED unit 271 comprises a plurality of light sources (LEDs) 272 arranged linearly. These plurality of LEDs are disposed at a supporting frame made of resin, for example, to keep equal distance to one another. These LEDs make up the LED unit 271 together with this supporting frame (see FIG. 13). In the present embodiment, a left and right pair of LED units 271 is disposed symmetrically on the base plate 280. These LED units 271 emit light toward the bottom face of the light guiding acrylic board 290. Since the upper face of the light guiding acrylic board 290 is covered with the panel 250, the light source 272 can be covered so that the viewer cannot see the light source directly.

The light guiding acrylic board 290 is a frame-shaped member that is disposed corresponding to the input screen for the game being played or the display screen of the game information at the casing 201. The light guiding acrylic board is disposed at an upper part of the casing 201 and guides light emitted from the light source 272 so that a predetermined position (the light emission part 298) appears to shine. This light guiding acrylic board 290 has a rectangular shape that is horizontally long, i.e., the dimension in width (depth direction) is larger than the dimension in length, and is a thin plate having a thickness that is much smaller than the dimensions in width and length. The light guiding acrylic board 290 has an opening for display unit 290a and an opening for reader unit 290b (see FIG. 13, for example). The opening for display unit 290a is formed corresponding to the position and the range of the game table display unit 263 of the casing 201. The opening for reader unit 290b is formed corresponding to the position and the range of the bill insertion/card reader unit 267.

The V-letter shaped groove 294 makes up a reflecting unit to reflect light that is emitted from the light source 272 and is incident on the light guiding acrylic board 290. The V-letter shaped groove 294 of the present embodiment is formed on each of the left and right of the upper face of the light guiding acrylic board 290 to be extension of the irradiation direction of the light from the light sources 272 arranged in left and right two lines (see FIG. 13). Each of these V-letter shaped grooves 294 comprises a vertically long groove having a V-letter shape in cross section that is elongated linearly in the lengthwise direction (depth direction) (see FIGS. 16 and 17). These V-letter shaped grooves are to reflect the light incident on the light guiding acrylic board 240 to the left-right directions for diffusion.

These V-letter shaped grooves 294 desirably have an inclined angle of the inclined face relative to the incident axis of the light that is around 45 degrees. This angle, however, is not limited to a specific value as long as it enables diffusion of the reflected light in the interior of the light guiding acrylic board 290 and can prevent the leakage of the reflected light to the outside from a position other than the light emission part 298 of the light guiding acrylic board 290. As long as such a condition is satisfied, the groove has other shapes, such as a U-letter shape in cross section. In the present embodiment, the inclined angle of the reflecting face (the face of the groove) is set at 45 degrees to set the reflected angle at 90 degrees relative to the incident angle of the light. This setting value of the reflecting face will vary with the incident angle.

The light emission part 298 is formed in the light guiding acrylic board 290 to transmit the light reflected from the V-letter shaped groove 294 and is diffused in the interior of the light guiding acrylic board 290 to the outside from the surface of the light guiding acrylic board 290. The light arrives at this light emission part 298 and is reflected irregularly, for example, for transmission to the outside. Due to the action of this transmitted light, the light emission part 298 appears to shine for the viewers (see FIGS. 3 and 4).

Similarly to the light emission part 248 on the rear face of the casing, such a light emission part 298 may include regularly arranged or irregularly arranged unevenness at a predetermined position of the light guiding acrylic board 290 that is formed by surface treatment. Light is irregularly reflected at such an uneven part, and is transmitted to the outside of the light guiding acrylic board 290. Specifically such a light emission part 298 can be formed by forming unevenness by printing, by sandblasting the surface of the light guiding acrylic board 290 or by applying a film with unevenness to the light guiding acrylic board 290, for example. Alternatively, light emission can be implemented by printing in white, for example.

The position of the light emission part 298 in the light guiding acrylic board 290 is not limited especially, and may be disposed at a desired position. In one example, the light emission part 298 of the present embodiment is formed along the outer periphery of the plate-like light guiding acrylic board 290 and the light emission part 298 is also formed along the inner periphery of each of the opening for display unit 290a and the opening for reader unit 290b so that these parts appear to shine (see FIGS. 3 and 4).

The panel 250 is a plate-like member that is stacked on the upper face of the light guiding acrylic board 290. The panel 250 has an opening for display unit 250a and an opening for reader unit 250b (see FIG. 13). The opening for display unit 250a is formed corresponding to the position and the range of the game table display unit 263 of the casing 201. The opening for reader unit 250b is formed corresponding to the position and the range of the bill insertion/card reader unit 267.

This panel 250 is made of aluminum, for example, and can block light. This panel 250 therefore blocks light transmitting through the upper face of the light guiding acrylic board 290 out of the light incident on the light guiding acrylic board 290. The panel 250 has a shape and a size such that, when the panel covers the upper face of the light guiding acrylic board 290, the viewer cannot see the light source 272 directly.

Figure 14:
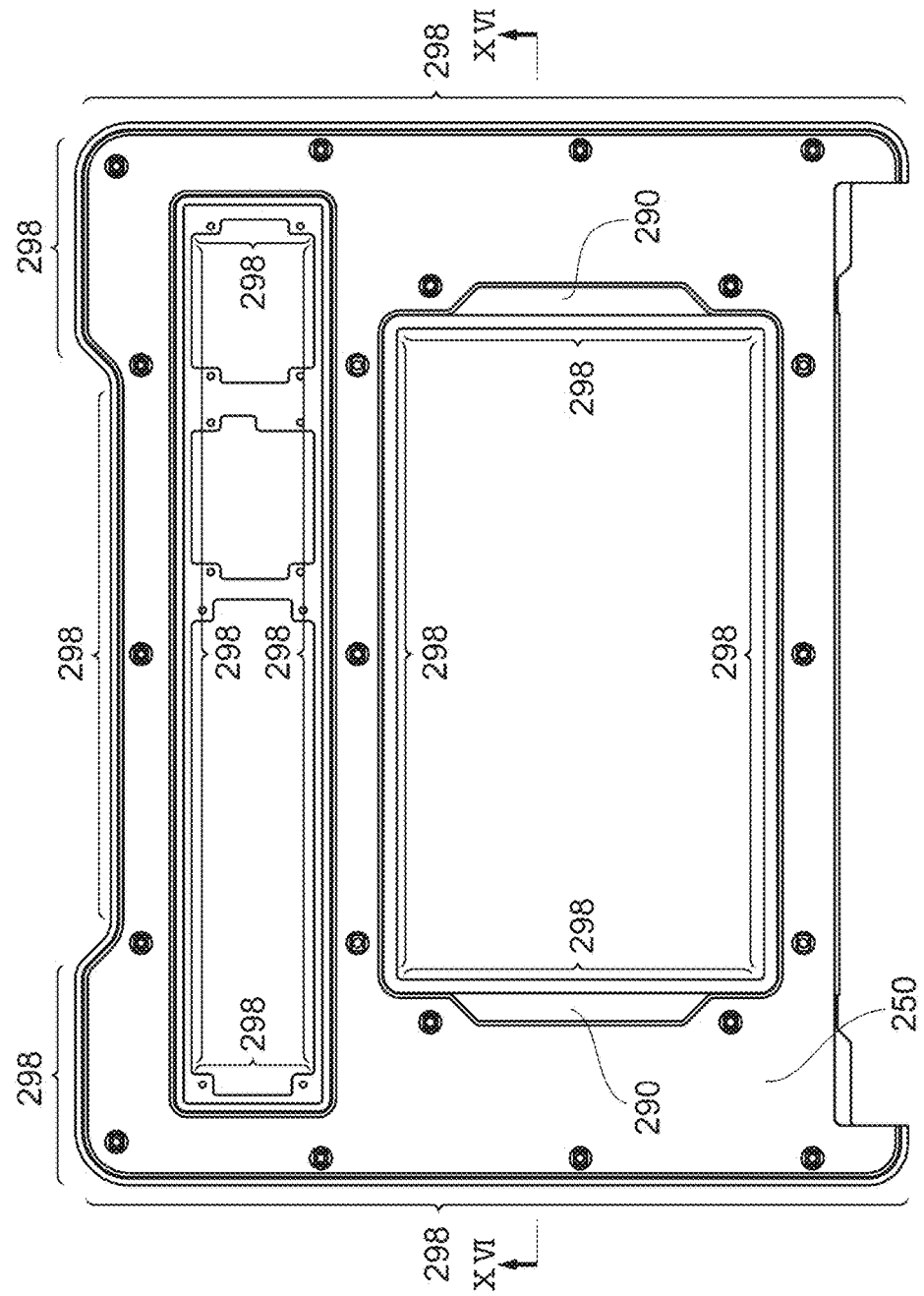
FIG. 14 is a plan view of the base plate, the light guiding acrylic board, and the panel in FIG. 12.
Figure 15:
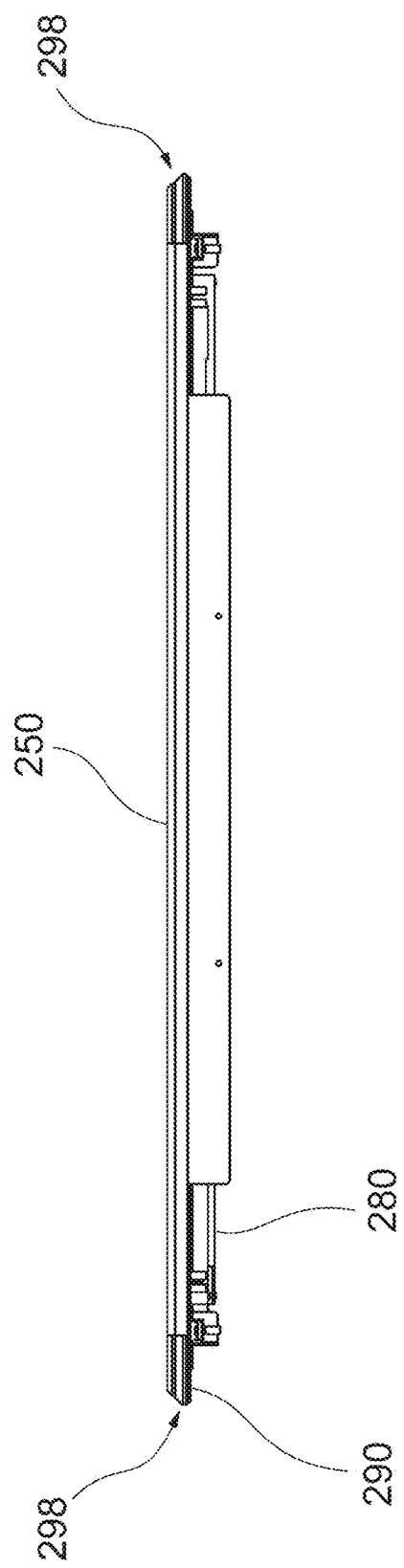
FIG. 15 is a front view of the base plate, the light guiding acrylic board, and the panel in FIG. 12.
Figure 16:
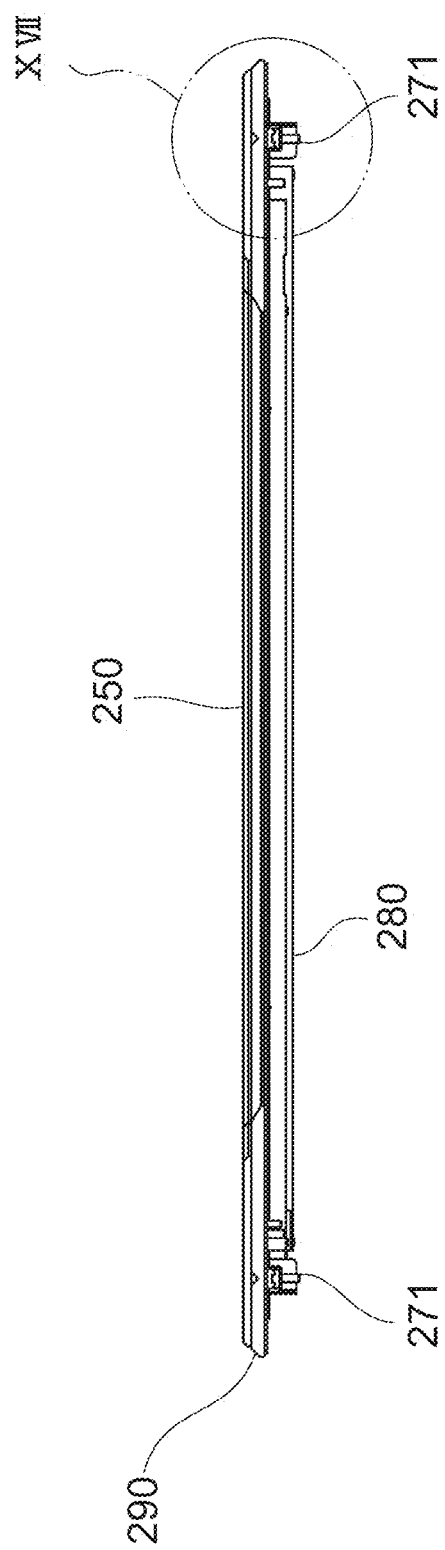
FIG. 16 is a cross-sectional view of the base plate, the light guiding acrylic board, and the panel taken along the line XVI-XVI in FIG. 14.
Figure 17:
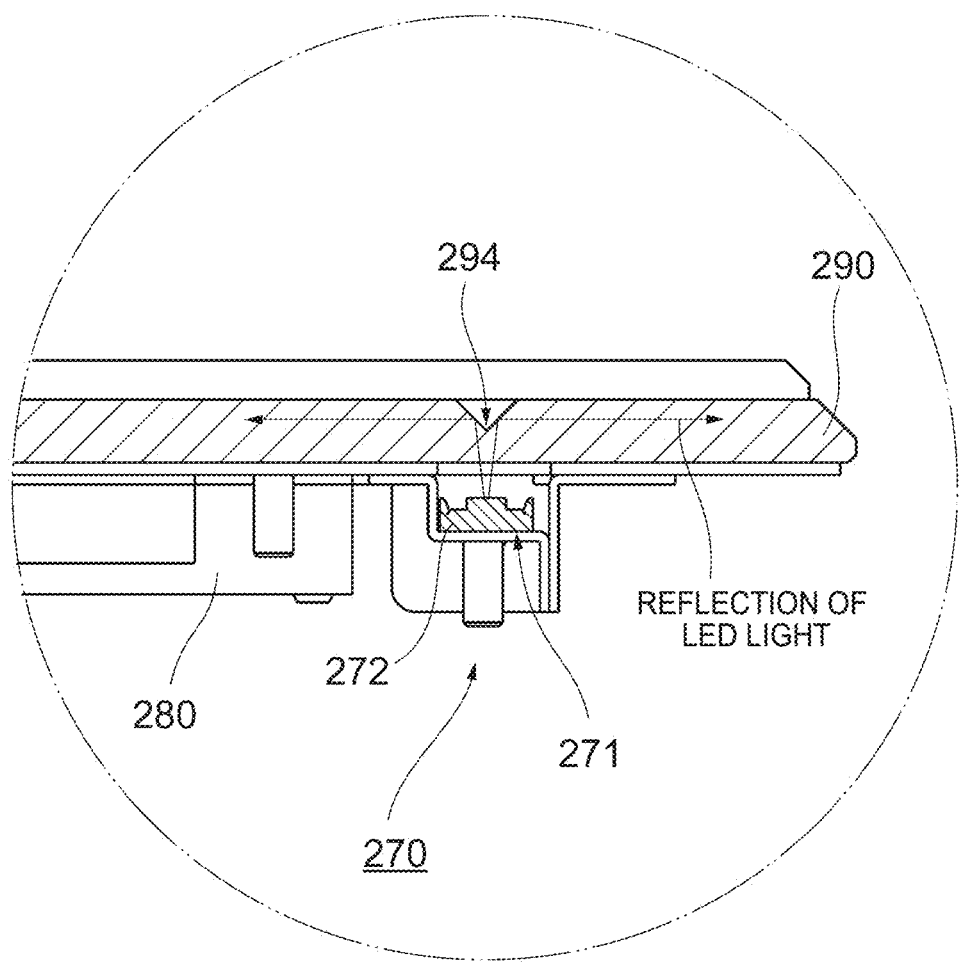
FIG. 17 is an enlarged view of a part indicated with XVII in FIG. 16.

The panel 250 has a shape and a size such that, when the panel is stacked on the upper face of the light guiding acrylic board 290, the light emission parts 298 formed in the light guiding acrylic board 290 can be exposed (see FIG. 14, for example).

The panel 250 is attached to the upper face of the light guiding acrylic board 290 to enhance the strength of the light guiding acrylic board 290. In the present embodiment, since the light guiding acrylic board 290 is sandwiched between the panel 250 and the base plate 280 from above and below, the strength as a whole can be enhanced more (see FIGS. 12 and 15, for example).

Light Sources of Light Emission Device

As stated above, the present embodiment comprises a plurality of LEDs as the light source 232 of the light emission device 220 and as the light source 272 of the light emission device 270. In this case, LEDs emitting light in different colors may be used, which is preferable because light in plurality of colors can be emitted. In such a case, the colors at the light emission part 248 can be gradually changed from the upper end 240T to the below of the light guiding acrylic board 240, for example. Alternatively, the colors of the light emission parts 248, 298 can be changed as the game goes on, which gives excitement to the game.

The light sources 222, 232, 272 may blink to turn the light emission part 248, 298 on or off.

Such a change in the color of light emitted or blinking of the light may have a function other than the effect of brightening the game. For instance, if any trouble such as malfunction occurs at the station device 200 comprising the casing 201 having the light emission devices 220, 270, the color of light emitted from the light emission part 248 or 298 can be changed or the light may blink, to notice the trouble.

According to the casing 201 of the present embodiment, only a part (light emission part 248) of the light guiding acrylic board 240 disposed at the rear part of the casing 201 can shine. At this time, other parts of the light guiding acrylic board 240 do not shine. Since the light sources 222, 232 are disposed inside of the casing 201 so that the viewer cannot see the light from these light sources 222, 232 directly, surrounding of the light sources 222, 232 also does not appear to shine. This can bring the appearance of the light emission part 248 to shine uniformly.

According to the casing 201 of the present embodiment, only a part (light emission part 298) of the light guiding acrylic board 290 disposed at the upper face of the casing 201 can shine. At this time, other parts of the light guiding acrylic board 290 are mostly covered with the panel 250. Further, since the light source 272 is disposed inside of the casing 201 so that the viewer cannot see the light from the light source 272 directly, surrounding of the light source 272 also does not appear to shine. This can bring the appearance of the light emission parts 298 to shine uniformly. Especially the present embodiment can have a configuration with a certain feature such that the outer periphery of the light guiding acrylic board 290 and the inner periphery of the opening for display unit 290a and the opening for reader unit 290b that are hollowed out appear to shine.

The present embodiment has a new configuration such that light is incident on the light guiding acrylic boards 240 and 290 from a first direction along the thickness direction toward the surface. With this configuration, the whole circumference of the end face of the light guiding acrylic boards 240 and 290 can shine easily. The whole circumference of the end face can shine with one LED, for example. In this way, shining can be implemented effectively with less light sources. The light source can be hidden easily, and so the device can have a sense of wondering. The device as a whole, comprising the light emission device 220, can have improved flexibility in designing.

According to the casing 201 of the present embodiment, the number of the light sources 222, 232, the colors of the light emitted, the intensity of the light and the surface treatment of the light emission parts 248, 298 may be combined, whereby the device can be brightened by illumination in an unconventional and characteristic way as if the light emerged from the casing. This can brighten the device with light having a fascinating impression, with light bringing showy atmosphere or fancy atmosphere, with light bringing elegant and sophisticated atmosphere as in a place for party, or with light bringing neo-futuristic atmosphere, for example.

This casing 201 comprises the light sources 222, 232 inside of the casing 201, and so there is no need to route the wiring around the casing 201. This can reduce the length of the wiring or the number of components.

The embodiment as stated above is one example of a preferable embodiment of the present disclosure, and the present disclosure is not limited to this embodiment. The present disclosure can be modified variously without deviating from the scope of the present disclosure. For instance, light sources comprising LEDs are described in one example, and this is just one preferable example. Other light sources such as lasers or can be used.

In the present embodiment, the light guiding acrylic board 240 (290) made of acrylic resin is exemplified as a specific example of the light guiding member to guide the incident light to the light emission part 248 (298). This also is just one preferable example, and other materials having the same function and features, such as a light guiding member made of polycarbonate, can be used.

The present embodiment describes a configuration such that light is incident on the light guiding acrylic boards 240 and 290 from a first direction along the thickness direction of these light guiding acrylic boards 240 and 290, i.e., the mode such that light is incident on the plane, i.e., toward the wide faces of the light guiding acrylic boards 240 and 290. The "first direction" in this case is not limited to one (single direction). For instance, when the curved light guiding acrylic board 240 is irradiated with light from the plurality of light sources 232 radially or in a fan-like shape as in the present embodiment, the direction of the light emitted from one of the light sources 232 along the thickness direction of the light guiding acrylic board 240 is the "first direction". Herein the "first direction" of the light emitted may be different from one light source 232 to another. That is, the first direction may be different from one light source to another as long as the light incident on the light guiding acrylic board 240 (or 290) is reflected in the direction different from the first direction from the reflecting unit (conical concave 242, V-letter shaped groove 244 or V-letter shaped groove 294) so that the light is diffused inside of the light guiding acrylic board 240 (or 290).

The present embodiment exemplifies the transmission member (light transmission acrylic rod member 224, light transmission acrylic board member 234) as the member of the light emission device 220, and this also is just one preferable example. Instead of having such a transmission member as a separate member, a part of the light guiding acrylic board 240 (such as a protrusion) may be used for transmission of light. Alternatively, instead of having such a transmission member, light may be incident directly on the light guiding acrylic board 240. Although the present embodiment comprises the light transmission acrylic rod member 224 as a transmission member, the bundle of optical fibers may be used instead as the transmission member. Such a bundle of optical fibers having flexibility can increase the freedom in designing.

The present disclosure is applicable preferably to a light emission device that is used in a game device having a casing.

TABLE OF REFERENCE NUMERALS

1 . . . main device
100 . . . game device
150 . . . chair
200(200-N) . . . station device
201 . . . casing
203 . . . footlight
220 . . . light emission device (at the rear part of casing)
221 . . . LED unit
222 . . . light source
223 . . . cabinet fixing part
224 . . . light transmission acrylic rod member (transmission member)
224*a* . . . one end face
224*b* . . . other end face
225 . . . supporting member
225*a* . . . through hole
225*b* . . . through hole
226 . . . urethane washer
227 . . . boss
228 . . . urethane washer
229 . . . covering member
231 . . . LED unit
232 . . . light source
233 . . . supporting frame
234 . . . light transmission acrylic board member (transmission member)
234*a* . . . one end face
234*b* . . . other end face
234*c* . . . through hole
235 . . . supporting angle member
235*a* . . . protrusion
236 . . . supporting angle member
236*a* . . . through hole
240 . . . light guiding acrylic board (light guiding member)
240T . . . upper end
241 . . . through hole
242 . . . conical concave (reflecting unit)
244 . . . V-letter shaped groove (reflecting unit)
248 . . . light emission part
249 . . . connecting pin
250 . . . panel (covering member)
250*a* . . . opening for display unit
250*b* . . . opening for reader unit
263 . . . game table display unit
265 . . . operation unit
267 . . . bill insertion/card reader unit
270 . . . light emission device
271 . . . LED unit 272 . . . light source
274 . . . light transmission acrylic board member (transmission member)
280 . . . base plate
280a . . . opening for display unit
280b . . . opening for reader unit
282 . . . light source
290 . . . light guiding acrylic board (light guiding member)
290a . . . opening for display unit
290b . . . opening for reader unit
294 . . . V-letter shaped groove (reflecting unit)
298 . . . light emission part
300 . . . master device
400 . . . network

What is claimed is:

1. A light emission device for a game device to be attached to a casing of the game device, comprising:
   a light source that is disposed in the casing;
   a light guiding member having a plate-like shape, the light guiding member being configured to guide light emitted from the light source, and being attached to the casing; and
   a transmission member disposed between the light source and the light guiding member, wherein the transmission member has a first end face through which light emitted from the light source enters and a second end face from which the light exits so as to be incident on the light guiding member,
   wherein the light guiding member is spaced apart from the casing by the transmission member,
   wherein the light guiding member includes:
      a reflecting unit configured to reflect the light incident from a first direction along a thickness direction of the light guiding member to a direction different from the first direction so as to diffuse the light in the interior of the light guiding member; and
      a light emission part configured to transmit the light reflected from the reflecting unit to outside from a surface of the light guiding member.

2. The light emission device for the game device according to claim 1, wherein the light emission part is formed along an end of the light guiding member.

3. The light emission device for the game device according to claim 1, wherein the light emission part includes regularly arranged or irregularly arranged unevenness that is formed by surface treatment.

4. The light emission device for the game device according to claim 1, further comprising a covering member configured to block light transmitting from a face opposed to an incidence face out of the light incident from the first direction.

5. The light emission device for the game device according to claim 1, wherein the light guiding member is disposed at a rear part of the casing.

6. The light emission device for the game device according to claim 1, wherein the light guiding member has an upper end that is disposed higher than the casing.

7. The light emission device for the game device according to claim 6, wherein the light guiding member is curved at a part or as a whole from the upper end to a lower end.

8. The light emission device for the game device according to claim 4, wherein the light guiding member is a frame member disposed corresponding to an input screen for a game being played at the casing or a display screen of game information.

9. The light emission device for the game device according to claim 8, wherein the covering member is a panel that is stacked on the light guiding member.

10. The light emission device for the game device according to claim 1, wherein the light source includes a plurality of LEDs enabling emission of light in a plurality of colors.

11. A casing for a game device, comprising the light emission device according to claim 1, wherein color of light emitted from the light emission device is changed or the light blinks when a trouble, such as malfunction, occurs.

12. The light emission device for the game device according to claim 1, further comprising a supporting member attached to the casing and which supports the light guiding member, wherein the transmission member is disposed within the supporting member.

13. The light emission device for the game device according to claim 1, further comprising a supporting member attached to the casing and which supports the light guiding member, wherein the transmission member is disposed adjacent to the supporting member.

* * * * *